United States Patent
Goeckner

Patent Number: 6,116,193
Date of Patent: Sep. 12, 2000

[54] SOW BREEDING SADDLE

[76] Inventor: Troy C. Goeckner, 9419 N. 2050 St., Dieterich, Ill. 62424

[21] Appl. No.: 09/434,730

[22] Filed: Nov. 5, 1999

[51] Int. Cl.[7] .................................................. A01K 21/00
[52] U.S. Cl. ............................................................. 119/858
[58] Field of Search .................................. 119/850, 858, 119/174, 907

[56] References Cited

U.S. PATENT DOCUMENTS

| | | | |
|---|---|---|---|
| 2,572,155 | 10/1951 | Hoyt ........................................ | 128/272 |
| 3,343,539 | 9/1967 | Moorhouse ............................. | 128/234 |
| 4,338,402 | 7/1982 | Suzuki .................................... | 435/287 |
| 4,577,591 | 3/1986 | Wesseldine ............................. | 119/143 |
| 5,536,243 | 7/1996 | Jeyendran ................................ | 600/35 |
| 5,644,902 | 7/1997 | Kemp ..................................... | 54/37.1 |
| 5,690,060 | 11/1997 | Dumoulin et al. ..................... | 119/858 |
| 5,868,661 | 2/1999 | Williams et al. ........................ | 600/35 |
| 5,876,378 | 3/1999 | Mbadugha ............................. | 604/152 |
| 5,881,673 | 3/1999 | Beach et al. ............................ | 119/174 |

OTHER PUBLICATIONS

W.L. Flowers, Enhancement of Fertility With A.I.: Effect of Oxytocin as a Pre–Breeding Stimuli, http://www.cals.ncsu.edu/an_sci/ann_rep94/wlflo89.html, Sep. 15, 1999.

Hog Slat, Inc. catalog, Winter 1999, p. 48, The Breed'n Buddy.

Minitube of America, 1997/98, Artificial Insemination of Swine, pp. 16 & 17, A History of Research and Development, The Most Advanced Catheters Available Today.

PIC USA, The 6 Habits of Highly Effective Inseminators.

Pig Improvement Company, Inc., The Swine AI Book, Chapter 6: The Femal Reproductive System, Chapter 7: How to Artificially Inseminate the Sow.

*Primary Examiner*—Thomas Price
*Attorney, Agent, or Firm*—Grace J. Fishel

[57] ABSTRACT

A breeding saddle for sows and gilts for use in artificial insemination that favorably affects litter size and farrowing rate, thereby improving productivity. The saddle has first and second straps and a vibrator for the straps. The first strap transmits vibrations to the animal's underline and the second strap transmits vibrations to a catheter inserted into her cervix thereby favorably affecting litter size and farrowing rate.

10 Claims, 3 Drawing Sheets

SOW BREEDING SADDLE

BACKGROUND OF THE INVENTION

1. Field of the Invention

The present invention relates to a breeding saddle that increases productivity in artificially inseminated sows.

2. Brief Description of the Prior Art

Productivity in a sow herd drives the profitability of a hog operation. Productivity is measured by number of pigs per sow per year and is a function of litter size and farrowing rate.

Artificial insemination (AI) is an increasingly used practice with sows. AI allows the pork producer to increase the number of offspring from the best boars. It also reduces the spread of sexually-transmitted diseases within the stock and prevents injuries common in natural service.

When a sow is in heat, AI involves passing a catheter into the sow's cervix. The catheter is usually given a twist as it is inserted and has a shape at the tip such that it locks in the muscular folds of the cervix to prevent back flow of the semen. The opposite end of the catheter is connected to a vessel containing semen. If the sow is being bred individually, the operator then stimulates the sow using the same techniques as a boar would, i.e., back pressure, rubbing the shoulders, rubbing the flanks and underline. If successful, this causes contractions in the sow's uterus and oviducts which suck in the sperm.

Inseminator fatigue is a problem. For an AI to be a quality breeding, the operator must take his time and not become complacent. Various AI supply companies sell breeding saddles that address the time problem. With these saddles, a belt is placed around the sow's belly, the tip of the catheter inserted into her cervix and the opposite end of the catheter bent upwardly and connected to a vessel containing sperm. The vessel is then attached to the belt around the sow's belly and the operator goes on to the next sow.

With unobserved matings, the catheter may slip and there may be back flow of the sperm. This happens as the contractions in the sow's cervix grab and release the catheter. If the sow swishes her tail, she may displace the catheter from its placement deep in the cervix, allowing the sperm to seep out the vagina. In addition, the sow may not suck in the semen, with the same vigorous contractions as she would if bred individually.

While breeding saddles presently on the market save time, they do not increase sow productivity. In fact, they may decrease productivity when there is less than an optimal population of sperm in the oviducts due to reduced uterine and oviduct contractions or back flow of the semen. A decrease in the contractions may also affect the number of eggs released during ovulation as that process is regulated by hormones activated in response to the external and internal environment of the sow. Fewer eggs will also decrease productivity as the litter will be smaller.

BRIEF SUMMARY OF THE INVENTION

In view of the above, it is an object of the present invention to provide a breeding saddle for use in artificial insemination that not only saves time and reduces operator fatigue, but which has a beneficial effect on sow productivity. Other objects and features of the invention will be in part apparent and in part pointed out hereinafter.

In accordance with the invention, a breeding saddle is provided for use in artificially inseminating a sow. The saddle has first and second straps and a vibrator. In use, the first strap encircles the sow's belly and is adjustable in length such that it can be cinched tight about the sow's belly. The vibrator is mounted on the first strap such that the vibrator can be positioned on the sow's back and the second strap is attached to the first strap for supporting a vessel containing semen and for stabilizing a catheter that is flowably connected with the vessel and that has been inserted in the sow's cervix. Vibrations from the vibrator are transmitted through the first strap to the sow's underline and through the second strap to the sow's cervix, likely stimulating uterine and oviductal contractions and oxytocin production, and thereby favorably affecting litter size and farrowing rate.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
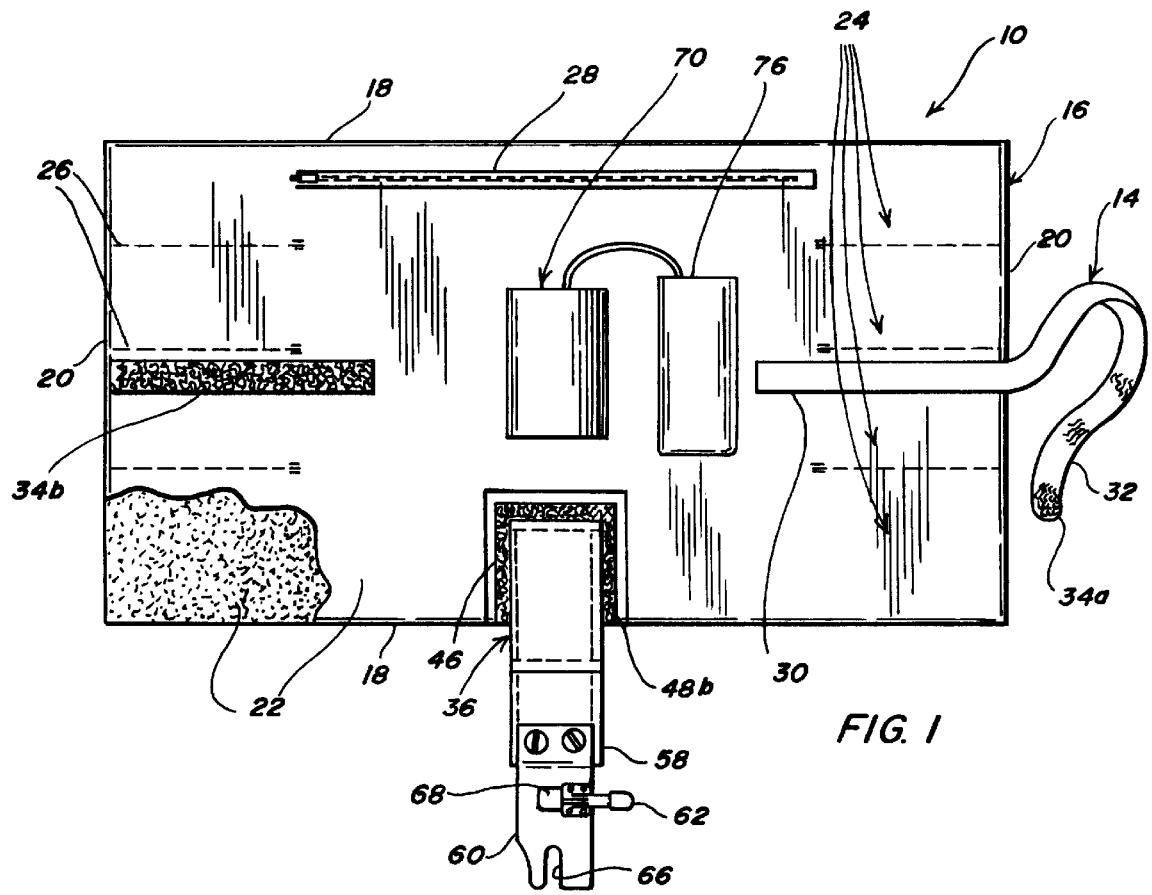
FIG. 1 is a plan view of a breeding saddle in accordance with the present invention, said saddle including, in major part, a blanket, first and second straps and a vibrator for the straps.
Figure 2:
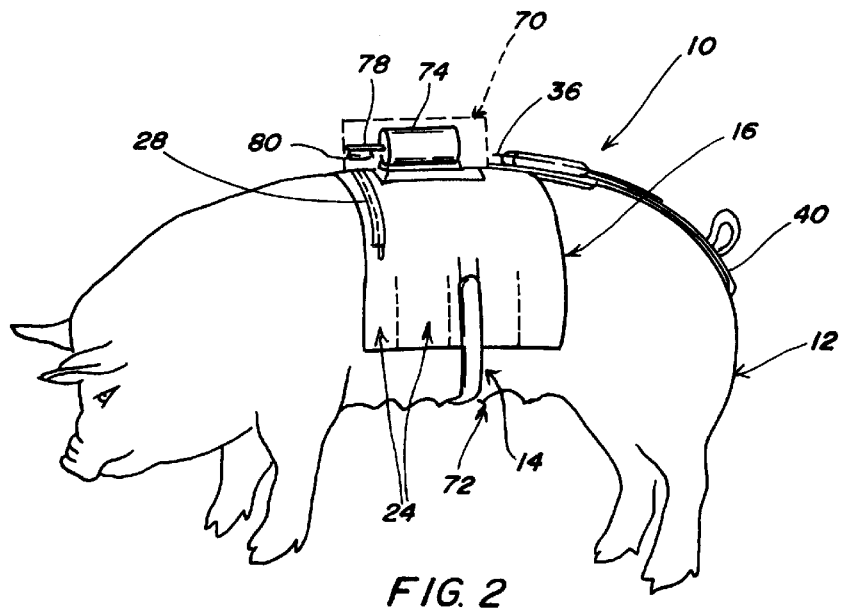
FIG. 2 is a perspective side view of the saddle in use on a sow.
Figure 3:
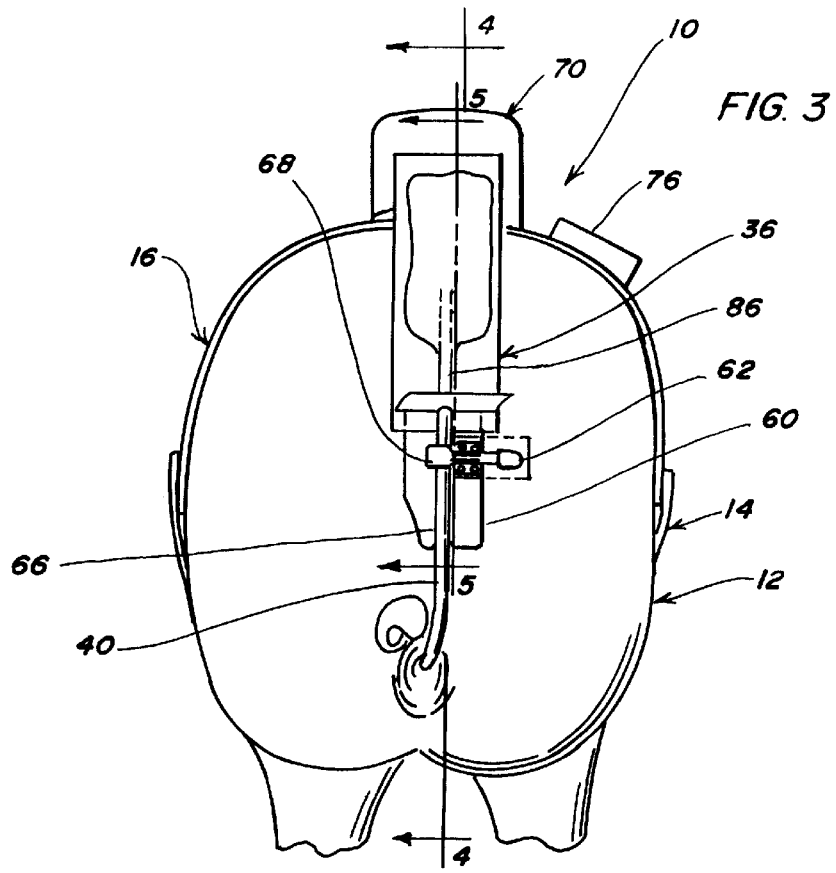
FIG. 3 is a rear view of the saddle on a sow.
Figure 4:
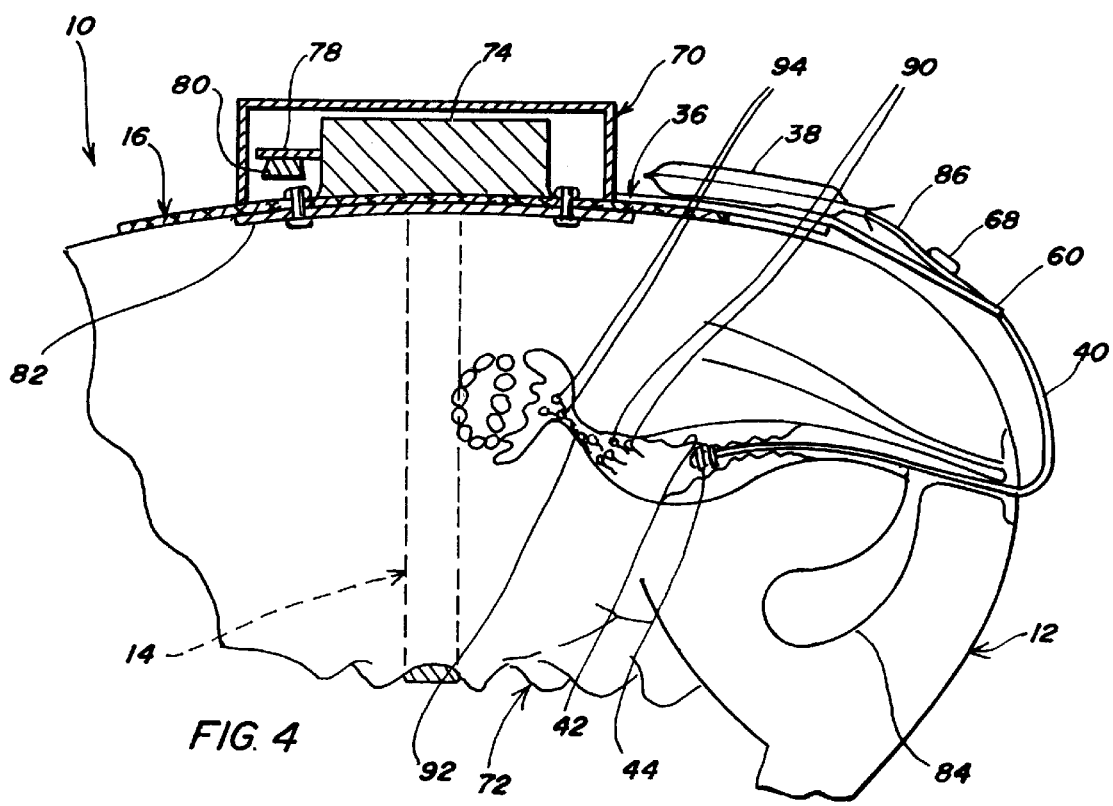
FIG. 4 is a sectional view taken along line 4—4 in FIG. 3.

Referring to the drawings more particularly by reference character, reference numeral 10 refers to a breeding saddle for a sow 12 in accordance with the present invention. Saddle 10 has a first strap 14 for encircling a sow's belly. In the embodiment illustrated in the drawings, strap 14 is attached to a blanket 16. It will be understood, however, that strap 14 may be a continuous band passing completely around the animal and blanket 16 eliminated.

Strap 14 may be a straight belt formed of any suitable durable material such as metal, fabric or leather. It is preferred that strap 14 be somewhat stiff but not so stiff that it will not conform to the sow's belly. For example, strap 14 may be formed of a double thickness of 3-inch wide plastic webbing such as used for seat belts, stitched together to form a stiff, but not too stiff, belt.

Blanket 16 is designed to drape over the sow's back and is generally rectangular with a pair of longer side edges 18 and a pair of shorter side edges 20. The length of blanket 16 along longer side edges 18 is such that the blanket extends a distance down the sow's sides, while blanket 16 along shorter side edges 20 has a length such that the blanket extends over the sow's loin. Blanket 16 thereby simulates the contact made by a boar on the sow's back, shoulders and flanks. Blanket 16 may be formed of two pieces of material 22 joined along side edges 18, 20. A plurality of open ended compartments 24 may be formed by a row of stitching 26 or the like generally perpendicular to short edges 20. A zipper opening 28 may be provided in one of pieces of material 22 for access to compartments 24 which may be filled with sand, lead shot, pieces of iron or the like to weight the saddle.

When first strap 14 is attached to blanket 16, first and second ends 30, 32, respectively, may be secured to blanket 16 with a fastening means such as one element 34a of a hook and pile fastener, such as is sold under the trademark VELCRO. A mating element 34b of the fastener may be secured to blanket 16 by stitching or the like. As illustrated in FIG. 1, the loop portion 34b of the VELCRO fastener is sewed on blanket 16, while the hook portion 34a is sewed on strap 14. It will be understood that the elements of the hook and pile fasteners may be reversed and that other closures and attachments may be used such as snaps, hooks, buttons, etc. as will occur to those skilled in the fastener art. One of first and second ends 30, 32 may be stitched or otherwise fixedly attached to blanket 16; however, it is preferred that both ends be detachable to accommodate use of saddle 10 by right and left handed operators.

In a preferred embodiment of saddle 10, blanket 16 is 18 inches by 36 inches and made of two layers of tarp material 22. A blanket having these dimensions can be used on most gilts and mature sows. It will be understood, however, that the invention is not limited to the particular dimensions given for the blanket, or to the materials mentioned. First strap 14 is 36 inches long, about 10 inches of which is sewed on blanket 16. The hook and pile fasteners 34a, 34b are about 12 inches long and stitched on strap 14 and blanket 16. These particulars are also illustrative, not limiting.

A second strap 36 is attached to blanket 16 along one of longer edges 18 (or to first strap 14 if blanket 16 is omitted). Second strap 36 supports a vessel 38 containing semen and stabilizes a catheter 40 that is flowably connected with vessel 38 and inserted into a sow's cervix 42. Various catheters are sold by AI supply companies. All of them have a tip 44 which is designed to lock in the muscular folds of cervix 42. In general, the tip is available in two primary configurations—namely, an elongate tip with a spiral flange and a bulbous tip with a circumferential groove. Each is designed to mimic the tip of a boar's penis and lock into the folds of the sow's cervix. It will be readily apparent that the present invention is not limited to any particular catheter, now existing or that may be developed in the future. In like manner, various AI supply companies provide semen in different vessels such as bags, bottles and the like. Saddle 10 may be used with all.

Second strap 36 may be a straight belt formed of any suitable durable material such as metal, fabric or leather. It is preferred that strap 36 be stiffer than first strap 14 for reasons which will become apparent. For example strap 36 may be formed of a quadruple thickness of 3-inch wide plastic webbing such as used for seat belts, stitched together to form a stiff belt.

Figure 5:
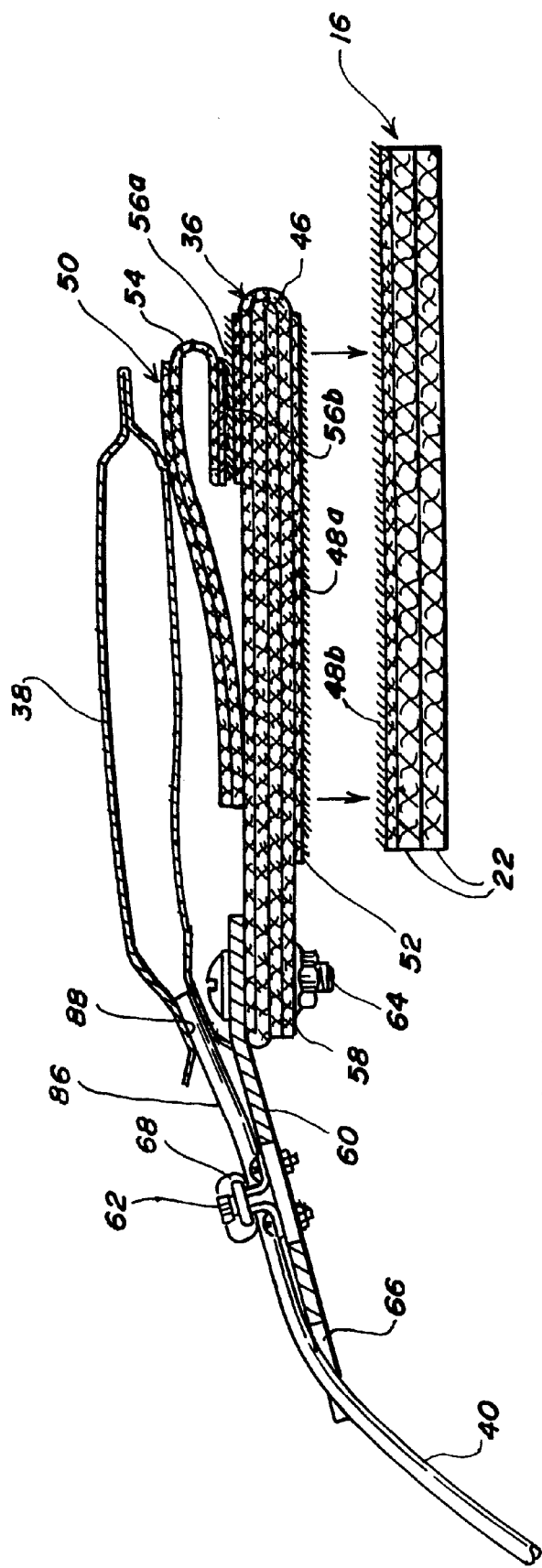
FIG. 5 is a detail in section and on an enlarged scale taken along line 5—5 in FIG. 3 showing a vessel containing semen mounted on the second strap.

A first end 46 of second strap 36 is outfitted with a fastening means such as one element 48a of a hook and pile fastener. A mating element 48b is provided on blanket 16 and provides the means by which second strap 36 is attached to blanket 16. As discussed above, the elements may be reversed and different fastening means are contemplated. When fastening means 48a, 48b are mating portions of a VELCRO fastener, the length of strap 36 overhanging blanket 16 may be adjusted to accommodate anatomical differences of various gilts and sows. For this purpose also, a third strap 50 may be attached to second strap 36. One end 52 may be stitched or the like to a top surface of second strap 36, while a second end 54 may be outfitted with a fastening means such as one element 56a of a hook and pile fastener. A mating element 56b is provided on second strap 36. As shown in FIG. 5, third strap 50 may be humped up on second strap 36 for support of vessel 38, an adjustment which may be necessary to ensure gravity flow of semen from vessel 38 if the sow is swaybacked. Once again, the invention is not limited to the particular fastening means shown in the drawings for third strap 50.

A second end 58 of second strap 36 is attached to a plate 60, upon which is mounted a toggle clamp 62. One end of plate 60 is attached to second strap 36 with suitable fasteners 64 such as bolts, rivets and so forth, while the other end terminates with a notch 66. A cushion 68 is provided on the end of toggle clamp 62 to avoid crushing catheter 40 which is pinched between cushion 68 and plate 60.

A vibrator 70 is mounted on blanket 16 (or first strap 14 if the blanket is omitted) such that the vibrator is positioned on the sow's back, along her ribs or on her underline. The purpose of vibrator 70 is to vibrate first strap 14 along the sow's sides and most particularly along her underline 72. It may also vibrate second strap 36, catheter 40 and tip 44 in cervix 42. Vibrator 70 may be rotary electric, electromagnetic, piezoelectric, pneumatic, hydraulic or the like, including vibrating diaphragms. The vibrations may be continuous or pulsed as described hereinafter.

With continuing reference to the preferred embodiment shown in the drawings, vibrator 70 is a rotary electric vibrator and comprises a 12 Volt DC motor 74 powered by a battery 76 held in a pocket. Motor 74 has an output shaft 78 rotated at 650 rpm with an eccentric weight 80. Output shaft 78 is generally parallel to the sow's spine with motor 74 mounted on her back. Since motor 74 and battery 76 weigh about 8 pounds, it is usually unnecessary to further weight blanket 16. This is an advantage over prior art saddles which are typically weighted with about 25 to 30 pounds of sand or like, making the saddle a chore to handle. While saddle 10 can be used without additional weights, if the operator wants to add weights to saddle 10, it does not have an adverse effect on sow productivity.

Motor 74 may be mounted on a plate 82 with blanket 16 sandwiched between the motor and the plate and plate 82 making contact with the sow's skin. In the preferred embodiment plate 82 is made of steel or some other metal, but in other embodiments it may be made of rubber, plastic or eliminated altogether in some instances. The purpose of plate 82 is to provide a mounting surface that will support vibrator 70 without tearing blanket 16. Another purpose of plate 82 is to effectively transmit the vibrations from vibrator 70 to the sows's underline through first strap 14 and to the sow's cervix 42 through second strap 36. Alternatively, both functions of plate 82 (i.e., motor support and vibration transmission) may be performed by blanket 16 or first and second straps 14, 36, depending upon the materials of which they are made.

In use, blanket 16 is placed on the back of sow 12 after estrus has been detected. First strap 14 is cinched tight around her belly, preferably midway between the front and rear legs, where it is unlikely to slip. It will be apparent, however, that strap 14 may be tightened around the sow's flank, or elsewhere along her belly, as desired. Catheter 40 is carefully but firmly inserted forwards and upwards into the vagina, avoiding entry into bladder 84. During estrus, the folds of the cervix are swollen, which enables tip 44 of catheter 40 to lock when rotated.

A free end 86 of catheter 40, opposite tip 44, is pushed into a nozzle 88 of vessel 38. Catheter 40 is bent upwards and forwards while vessel 38 is given a gentle squeeze to start the flow of semen. Vessel 38 is placed on second strap 36 and catheter 40 is caught in notch 66 and pinned against plate 60 with toggle clamp 62. Vibrations from vibrator 70 may be started, or may have already been started when blanket 16 is installed and first strap 14 tightened, and continue uninterrupted during the AI procedure, or may be pulsed from time to time. Since catheter 40 is wedged in notch 66 and caught under toggle clamp 62, the catheter will not become dislodged as the sow's uterine contractions grip and release tip 44 even though she may hit the catheter as she swishes her tail. This maintains the catheter deep in the cervix and prevents semen loss during insemination. It also keeps vessel 38 from being knocked off second strap 36.

Vibrations from vibrator 70 along underline 72, in particular, and cervix 42, likely stimulate the production of oxytocin. Oxytocin has been shown to enhance sperm transport via stimulation of uterine and oviductal contractions. This increases productivity as it ensures that there will be an optimal population of sperm 90 in oviducts 92 where conception occurs. The chance for back flow of the sperm is also minimized by plate 60 with notch 66 and toggle clamp 62, thereby also ensuring the effective delivery of the sperm to the oviducts. The vibrations may also increase the number of eggs 94 released during ovulation. These factors combined may account for the observed improvement in productivity through increased litter size and farrowing rate.

The following example illustrates the invention.

EXAMPLE 1

A population of 206 sows and gilts (PIC Line 42 (Pig Improvement Company)) were divided into two groups: Group I contained 111 animals and Group II (Control group) had 95. The animals in Group I were bred using saddle 10, while those in Group II were bred manually. PIC Semen Line 19 was used for all inseminations. Groups I and II contained a randomized number of gilts and sows and a randomized number of sows of a given parity. The AI was performed over a period of about 6 months, modulating the effect of weather on the data, it being known that hot weather adversely affects farrowing rates and number of live births. The effect on litter size and farrowing rate are shown in Tables 1 and 2, respectively.

TABLE 1

Litter Size

|  | # of Sows/Gilts | # of Pigs born alive | Net Advantage |
|---|---|---|---|
| Group I | 111 | 12.02 | 1.78 |
| Group II | 95 | 10.23 |  |

TABLE 2

Farrowing Rate

|  | # of Sows/Gilts | Farrowing Rate |
|---|---|---|
| Group I | 111 | 87.4% |
| Group II | 95 | 85.0% |

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A breeding saddle for use in artificially inseminating a sow, said saddle comprising:
    a first strap for encircling the sow's belly, said strap being adjustable in length such that it can be cinched tight about the sow's belly;
    a vibrator mounted on the first strap such that the vibrator can be positioned on the sow's back; and,
    a second strap attached to the first strap for supporting a vessel containing semen and for stabilizing a catheter that is flowably connected with the vessel and that has been inserted in the sow's cervix,
    whereby vibrations from the vibrator are transmitted through the first strap to the sow's underline and through the second strap to the sow's cervix, thereby favorably affecting litter size and farrowing rate.

2. The saddle of claim 1 wherein the first strap is attached to a blanket covering a portion of the sow's back and extending down her sides.

3. The saddle of claim 2 wherein a first end of the second strap is detachably attached with a fastener to the blanket and a second end of the second strap is attached to a plate, said plate having a notch in which the catheter can be wedged and a toggle clamp for pinching the catheter between the clamp and the plate to prevent displacement of the catheter from the sow's cervix.

4. A breeding saddle for use in artificially inseminating a sow, said saddle comprising:
    a blanket covering a portion of the sow's back and extending down her sides;
    a first strap having first and second ends, said first end fixedly attached to the blanket and said second end detachably attached to the blanket, said first strap encircling the sow's belly and being adjustable in length such that it can be cinched tight about the sow's belly;
    a vibrator mounted on the blanket such that the vibrator can be positioned on the sow's back; and,
    a second strap attached to the blanket for supporting a vessel containing semen and for stabilizing a catheter that is flowably connected with the vessel and that has been inserted in the sow's cervix,
    whereby vibrations from the vibrator are transmitted through the first strap to the sow's underline and through the second strap to the sow's cervix, thereby favorably affecting litter size and farrowing rate.

5. The saddle of claim 4 wherein a first end of the second strap is detachably attached with a fastener to the blanket and a second end of the second strap is attached to a plate, said plate having a notch in which the catheter can be wedged and a clamp for pinching the catheter between the clamp and the plate to prevent displacement of the catheter from the sow's cervix.

6. The saddle of claim 5 wherein the clamp is a toggle clamp.

7. The saddle of claim 4 wherein the vibrator is a motor connected to a battery mounted on the blanket, said motor having an output shaft with an eccentric weight and attached to a plate under the blanket.

8. The saddle of claim 7 wherein the plate is formed of metal.

9. A breeding saddle for use in artificially inseminating a sow, said saddle comprising:
    a blanket covering a portion of the sow's back and extending down her sides, a first strap having first and second ends, said first end fixedly attached to the blanket and said second end detachably attached to the blanket, said first strap encircling the sow's belly and being adjustable in length such that it can be cinched tight about the sow's belly;

a motor connected to a battery, said motor and battery mounted on the blanket such that the motor and battery can be positioned on the sow's back, said motor having an output shaft with an eccentric weight and attached to a plate under the blanket;

a second strap having a first end for supporting a vessel containing semen, said first end detachably attached with a fastener to the blanket and a second end attached to a plate, said plate having a notch in which a catheter can be wedged and a clamp for pinching the catheter between the clamp and the plate, said catheter having a tip for insertion into a sow's cervix and a free end flowably connected with the vessel, said notch and clamp stabilizing the catheter in the cervix;

whereby vibrations from the vibrator are transmitted by the plate through the first strap to the sow's underline and through the second strap to the sow's cervix, thereby favorably affecting litter size and farrowing rate.

10. The saddle of claim 9 wherein the clamp is a toggle clamp.

* * * * *